Nov. 6, 1928.

B. H. URSCHEL 1,690,510

AUTOMOBILE AXLE

Filed Oct. 5, 1927

Inventor

Bertis. H. Urschel

By Faust F. Crampton

Attorney

Patented Nov. 6, 1928.

1,690,510

UNITED STATES PATENT OFFICE.

BERTIS H. URSCHEL, OF BOWLING GREEN, OHIO, ASSIGNOR TO URSCHEL ENGINEERING COMPANY, OF BOWLING GREEN, OHIO, A CORPORATION OF OHIO.

AUTOMOBILE AXLE.

Application filed October 5, 1927. Serial No. 224,136.

My invention has for its object to provide a light weight and an exceedingly strong durable axle. The invention particularly has for its object to provide a tubular axle having parts thereof so constructed and shaped that the axle will withstand the stresses and strains to which it may be subjected and yet, which by reason of its tubular form, will be lighter in weight than a solid axle.

The invention also has for its object to provide an axle of the character described at a low cost. Hence, the invention provides an axle, that may be made of tubing, parts of which are so formed that the axle may be mounted in a vehicle and efficiently perform the functions for which it is designed.

The invention may be contained in tubular axles that vary in their details of construction and, to illustrate a practical application of the invention, I have selected an axle containing the invention as an example of the various constructions that embody the invention and shall describe it hereinafter. The axle selected is shown in the accompanying drawings.

Figure 1:
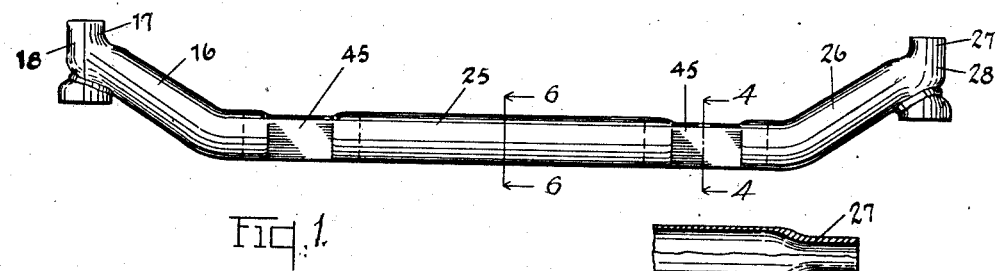
Figure 2:
Figure 4:
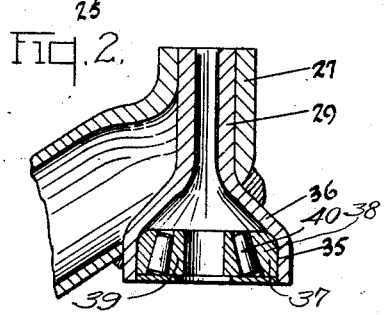
Figure 3:
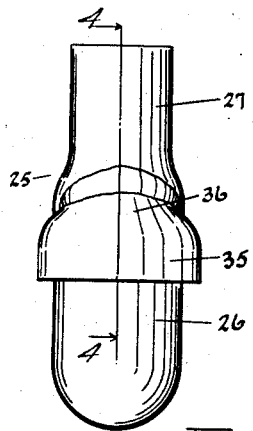

Fig. 1 is a side view of the axle. Fig. 2 illustrates the swaged end of the axle which is formed in advance of shaping it to the form shown in Fig. 1. Fig. 3 is an end view of the axle. Fig. 4 is a view of a section taken on the plane of the line 4—4 indicated in Fig. 1.

To form the axle shown in the figures, a tubular member is swaged at its ends substantially as shown in Fig. 2. The thickness of the ends is increased accordingly. For example, it may be reduced from an outside diameter 2¼" to 1½" and the thickness from ⅛" to about ¼". This greatly increases the strength of the axle.

The axle 25 is bent to form the angularly upwardly extending portions 26 and the swaged end parts 27 are bent as at 28 to extend at right angles to the body of the axle 25. The end parts 27 are provided with bearing members for the stub axles of the vehicle.

In the form shown, tubes 29 having exterior diameters substantially the same as the interior diameters of the end portions of the axle 25, are located within the end portions. Each end part is bored so that the tube 29 may extend vertically through the elbow that is formed by the bend 28 and through the part 27 and so that the tube 29 will fit the inner surface of the end part 27. The tube 29 is welded to the end part 27 to rigidly secure the tube 29 in position. The tubes 29 form a bearing support for the stub axle pin of the wheel that is connected to each end of the axle 25.

The tubes 29 have enlarged lower end portions 35 that are cylindrical in form. Each tube 29 is provided with a flaring skirt 36, a portion of which lies within the outer surface of the elbow that is formed by the bend 28. The tube 29 is welded along the intersecting line between the surfaces of the elbow and the lower end of the tube. A large part of the intersecting line is located on the flaring portion 36 and, consequently, the axle, together with the weight that it supports, is supported on the tubes 29 that are located in the ends of the axle. The enlarged end portion 35 is adapted to receive the roller bearing 37 that is provided with the usual cone shaped collars 38 and 39 and the cone rollers 40. The rollers 40 are connected together in the usual way as by a cage in order to form a thrust bearing for supporting the pressure that is transmitted through the tube 29.

In order to connect the axle to the body of the vehicle, such as to suitable springs, the axle is shaped at the points of connection so that the axle may sustain both torque and shearing stresses and so as to prevent any turning of the tubular axle relative to the parts that it is connected to. The tubular axle is, preferably, provided with relatively short flattened portions 45 at two points in the central part of the axle which will prevent rotation of the axle when clamped to the springs of a vehicle.

I claim:

1. An axle for vehicles comprising a tubular member, the ends of the tubular member turned to extend substantially vertically and tubes fitting the interior of the said turned end portions of the tubular member and extending through the elbow formed at the junction of the main portion of the axle member and the substantially vertical ends.

2. An axle for vehicles comprising a tubular member having substantially vertically extending end portions and substantially vertically disposed tubes located in the said end portions.

3. An axle for vehicles comprising a tubular member, the end portions of the tubular member bent at an angle to the body portion of the tubular member and bearing tubes extending through the elbows of the bent portions of the tubular member.

4. An axle for vehicles comprising a tubular member having reduced end portions bent at an angle to the body portion of the tubular member and bearing tubes extending into the end portions of the tubular member and located at right angles to the axis of the body portion of the tubular member.

5. A vehicle axle comprising a tubular member having upturned end portions, the elbows thus formed having openings in alignment with the ends to provide vertical bearings.

6. A vehicle axle comprising a tubular member having upturned end portions, and vertical bearing members extending through the elbows thus formed and fitting the interior of said upturned end portions.

7. A vehicle axle comprising a tubular member having upturned ends, and vertical bearing members extending through the elbows thus formed and fitting the interior of said upturned end portions, said bearing members having enlarged portions beneath the elbows for supporting said tubular member.

8. A vehicle axle comprising a tubular member having upturned ends, and vertical bearing members extending through the elbows thus formed and fitting the interior of said upturned end portions, each of said bearing members having a flaring skirt protruding through the elbow for supporting said tubular member.

In witness whereof I have hereunto signed my name to this specification.

BERTIS H. URSCHEL.